July 7, 1964  G. D. BIELINSKI ETAL  3,139,778
APPARATUS FOR STRIPPING COVERINGS FROM WIRE
Filed May 24, 1961  3 Sheets-Sheet 2

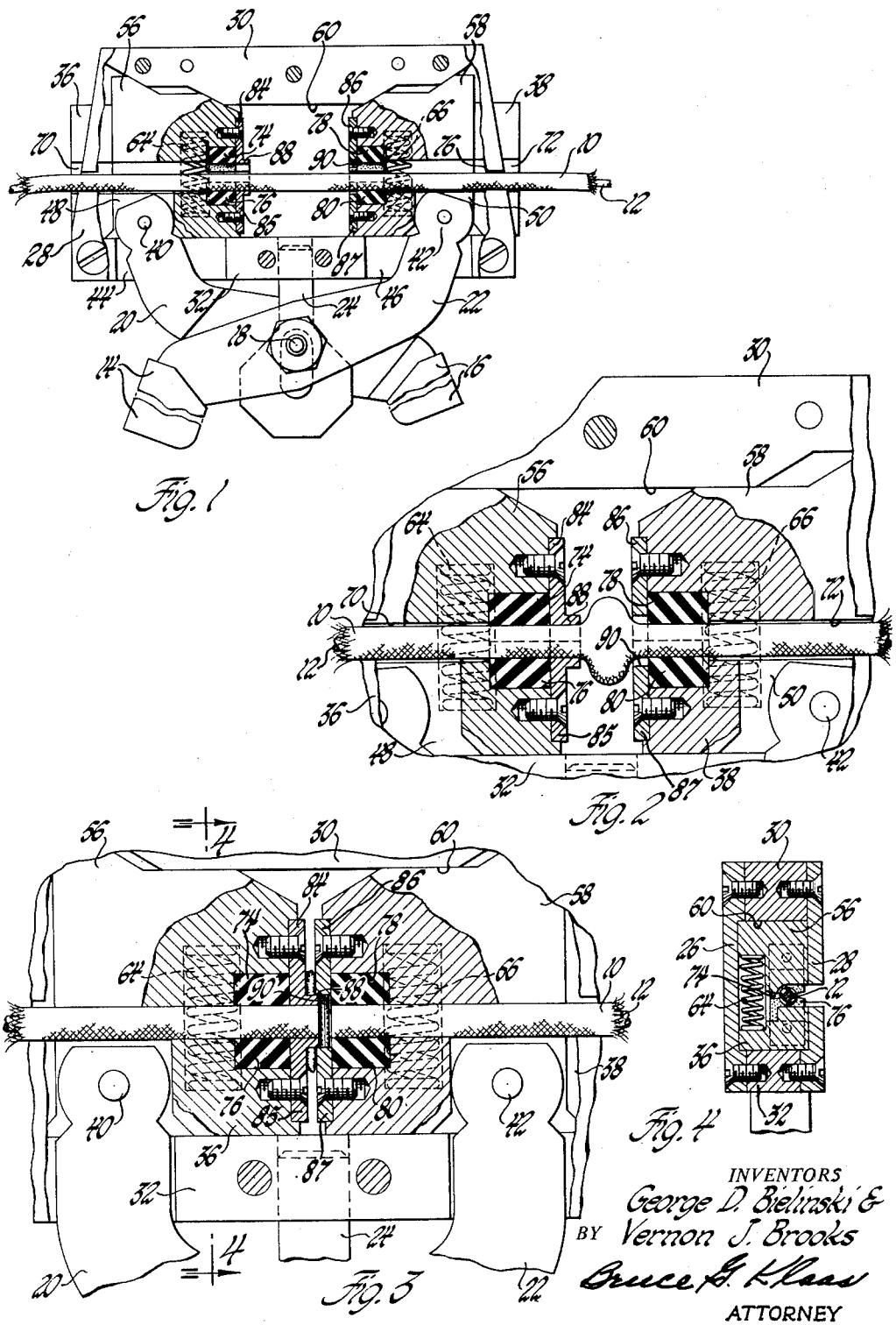

INVENTORS
George D. Bielinski &
BY Vernon J. Brooks

Bruce G. Klaas
ATTORNEY

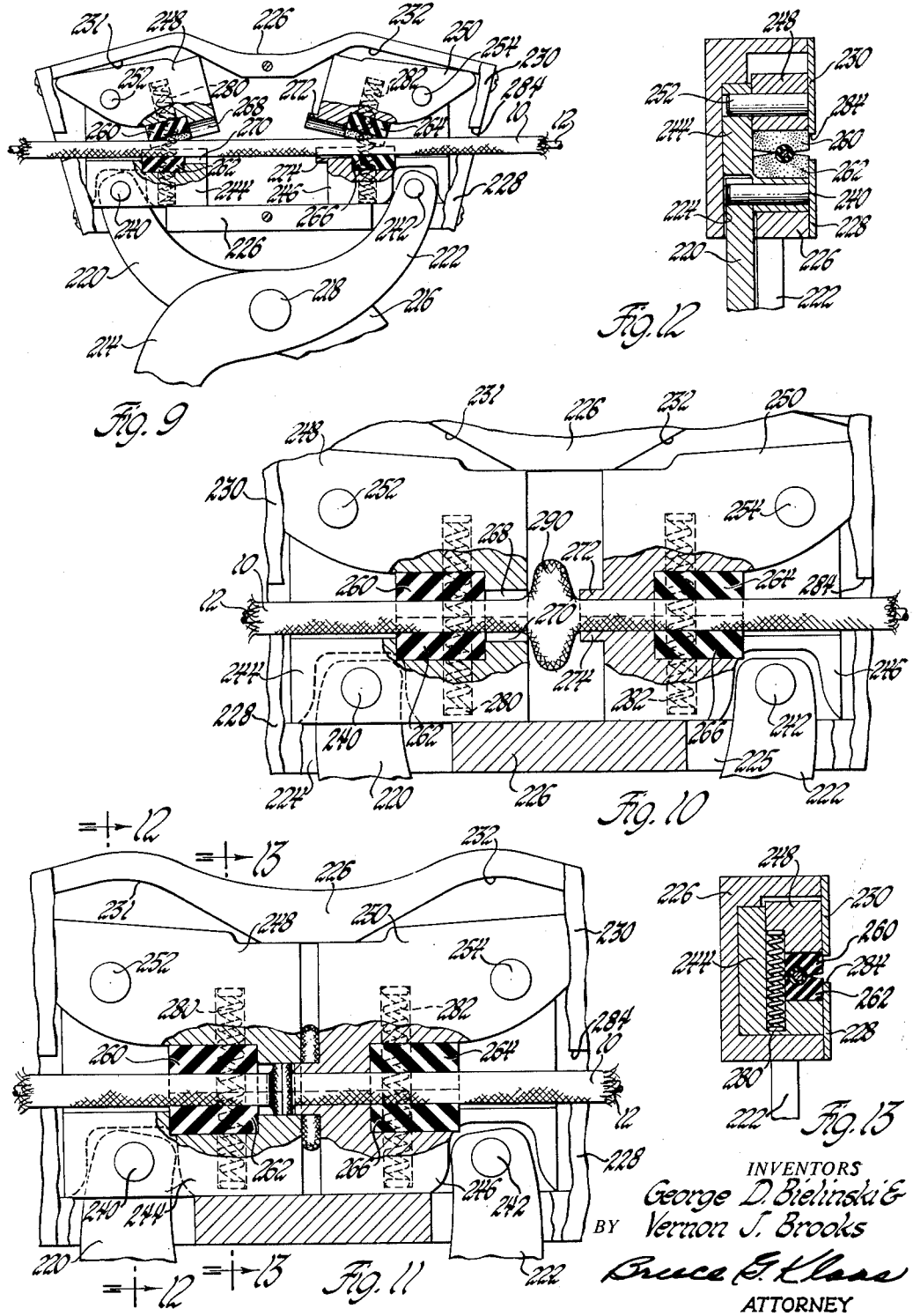

United States Patent Office 3,139,778
Patented July 7, 1964

1

3,139,778
APPARATUS FOR STRIPPING COVERINGS FROM WIRE
George D. Bielinski and Vernon J. Brooks, Milwaukee, Wis., assignors to General Motors Corporation, Detroit, Mich., a corporation of Delaware
Filed May 24, 1961, Ser. No. 112,389
6 Claims. (Cl. 81—9.51)

This invention relates to apparatus for stripping coverings from wire or the like.

The invention is particularly adapted for use in removing coverings, such as wire braid, from portions of electrical wire conductors to expose portions of the wire conductors for connection with other electrical elements. The invention is equally well suited for stripping a section of any covering material on wire-like elements.

The invention involves the use of a pair of spaced movable slide devices having clamping and severing means. A wire element to be stripped is positioned in a guideway provided therefor extending between the devices. The clamping means are movable from an open position to a closed position and carry gripping portions which are automatically engaged with spaced portions of the covering of the wire member as the devices are moved toward one another. The gripping portions engage the wire covering and shift the covering relative to the wire as the slide devices move from a spaced position along said wire to a position closely adjacent one another. In addition, the movable slide devices carry severing means which are moved into severing position relative to the wire covering as the clamping means are moved toward one another. The movement of the wire covering causes a portion thereof to be radially outwardly flared between the severing means. At the end of the movement of the slide devices and after the clamping means have been moved to the closed position, the radially outwardly flared portion of the wire cover is severed adjacent each of the slide devices so that a length of the wire covering is removed between the portions of the wire which are engaged by the gripping portions.

A further object of this invention is to provide new and improved apparatus having means to sever a length of covering material between covered portions of a wire conductor or the like. Still another object of this invention is to provide covering stripping means for wire elements which may be conveniently actuated in the manner of a pliers-type tool. A further object of this invention is to provide novel means for positioning and preparing a wire covering for a subsequent cutting and removing operation. Another object of this invention is to provide new and improved means for severing a wire covering without leaving frayed and uneven edges. Other objects and advantages will be apparent by reference to the following description and the accompanying drawings wherein:

FIGURE 1 is a side view, partially in section, of apparatus embodying the present invention;

FIGURE 2 is an enlarged partial sectional view of the apparatus shown in FIGURE 1 in a subsequent operational position;

FIGURE 3 is an enlarged partial sectional view of the apparatus shown in FIGURES 1 and 2 at the end of the operational sequence;

FIGURE 4 is a sectional view taken along the line 4—4 in FIGURE 3;

Figure 5:
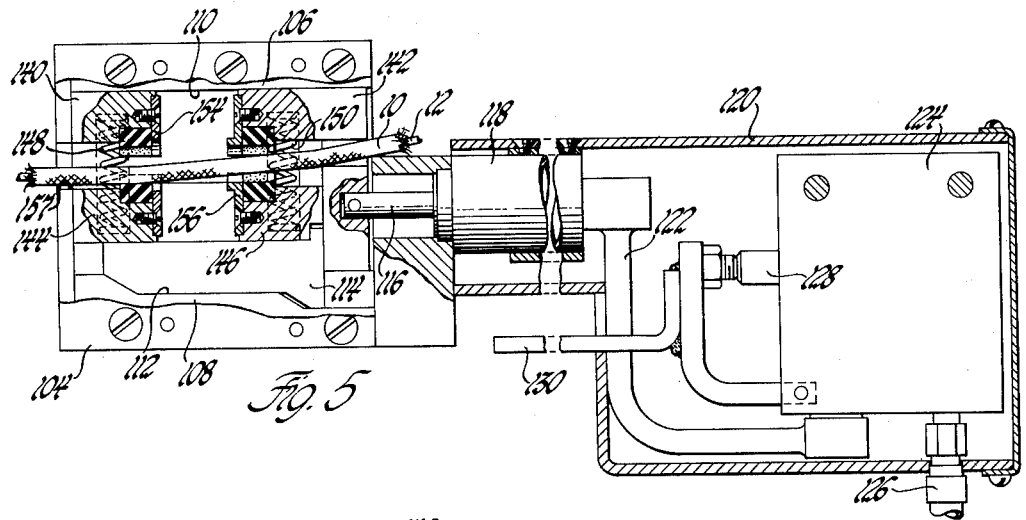
FIGURE 5 is a side elevational view, partly in section, of another embodiment of the present invention.
Figure 6:
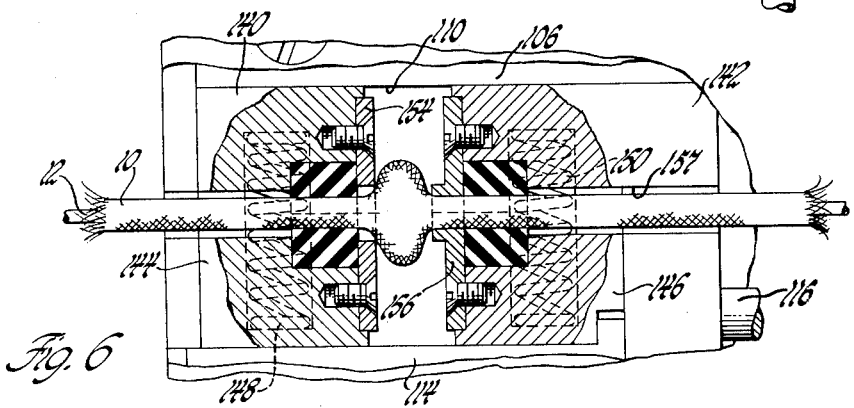
FIGURE 6 is an enlarged, partial sectional view, of the apparatus shown in FIGURE 5 in another operational position.
Figure 7:
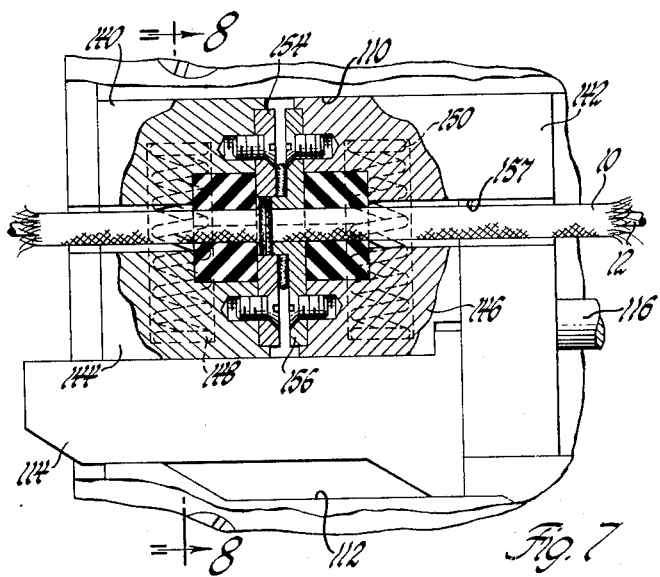
FIGURE 7 is a partial sectional view of the apparatus
Figure 8:
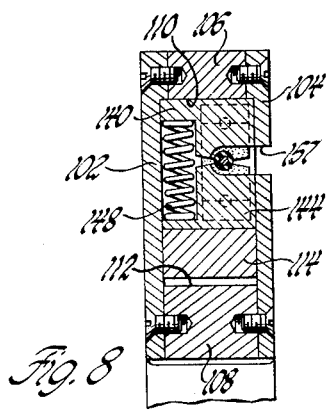

2 shown in FIGURES 5 and 6 at the end of the operational sequence;

FIGURE 8 is a sectional view taken along the line 8—8 in FIGURE 7;

FIGURE 9 is a side elevational view, partly in section, of another embodiment of the present invention;

FIGURE 10 is an enlarged partial sectional view of the apparatus shown in FIGURE 9 in a subsequent operational position;

FIGURE 11 is another enlarged, partial sectional view, of the apparatus shown in FIGURES 9 and 10 at the end of the operational sequence;

FIGURE 12 is a sectional view taken along the line 12—12 in FIGURE 11; and

FIGURE 13 is a sectional view taken along the line 13—13 in FIGURE 11.

Referring now to FIGURES 1–4, a hand tool for removing a covering 10 from a wire conductor 12 embodying the present invention is illustrated. The tool comprises an operating head or housing which is mounted on a pair of actuating handles 14, 16 that are pivoted at 18 and have upwardly and outwardly extending actuating arm 20, 22. The handles are further connected to the head portion by a pin element 24. The actuating head comprises a pair of spaced side plates 26, 28 which are suitably fastened to upper and lower spacer blocks 30, 32 to define a central guideway. A pair of spaced slide block units 36, 38 are slidably mounted in the guideway and pivotally connected at 40, 42 to the ends of the actuating arms 20, 22. The arms 20, 22 extend through slots 44, 46 in the lower spacer block 32 and into support and control cavities 48, 50 provided in the slide blocks 36, 38, respectively. Movable clamping blocks or jaws 56 and 58 are transversely slidably mounted on the slide units 36, 38. The upper surfaces of the jaws 56, 58 are cam contoured and are biased upwardly into cam contoured portions of a lower surface 60 of the upper spacer block 30 by compression springs 64, 66 which are seated and exert an outward opening bias between the slide blocks 36, 38 and jaws 56, 58, respectively. The slide blocks and jaws define wire grooves 70, 72 which are axially aligned and open laterally through an access slot 76 in the side plate 28. Each of the slide blocks and associated jaws form a clamping means to engage the covering 10. Each of the clamping means is provided with gripping means adjacent its inner end comprising rubber bushing elements 74, 76 and 78, 80. The inner surfaces of the rubber gripping elements extend radially inwardly beyond the adjacent surfaces of the grooves 70, 72 and have arcuate outer surfaces adapted to receive the covering 10 as shown in FIGURE 4. The rubber gripping elements extend inwardly a distance sufficient to cause a compressive gripping action on the covering 10 of the wire 12 when the jaws 56, 58 have been forced inwardly against the bias of the compression springs 64, 66 at shown in FIGURES 2 and 3. The compressive force exerted by the gripping elements on the covering 10 is sufficient so that there is substantially no slippage therebetween as the clamping means are moved toward one another so that the covering portions between the gripping means will be moved axially of the wire element 12 to radially outwardly flare the covering portion in the spacing interval therebetween as shown in FIGURE 2.

Severing means comprising punch plate sections 84, 85 are secured to one of the clamping means and die plate sections 86, 87 are secured to the other of the clamping means. A cylindrical punch portion 88 is formed by the plate sections 84, 85 and spaced circumjacent the covering 10 which extends therethrough. The die plate sections define a circular punch cavity 90 which is coaxial with the punch portion 88 and dimensioned and located to receive the punch portion as shown in FIGURE 3. The covering 10 extends through the punch cavity and the flared portion extends radially outwardly beyond the punch portion when the punch enters the cavity. The punch and cavity have approximately the same diameter so that the flared portion of the covering will be severed as shown in FIGURE 3.

In operation and with the tool in the normally open position of FIGURE 1, a wire conductor or the like from which a portion of the covering is to be removed is placed within the grooves 70, 72 through the access opening 76. The actuating arms 20, 22 are in their widest position and the slide blocks 36, 38 are in their furthest outward position whereat the jaws 56, 58 are biased upwardly into engagement with the cam surface 60 of the upper spacer plate 30 by the compression springs 64, 66. In this manner, the portions of the grooves 70, 72 defined by the jaws are maintained at a width substantially wider than the width of the covering 10. As the handles 14, 16 are moved towards one another, the actuating arms 20 and 22 move about the pivot 18 and the pivots 40, 42 to force the slide blocks 36, 38 toward one another. The jaws 56, 58 are carried inwardly and gradually forced downwardly by the cam surface 60 against the bias of the compression springs until the rubber gripper means 74, 76, 78, 80 are forced into gripping engagement with the covering 10 as shown in FIGURE 2. The covering 10 has substantially no sliding movement relative to the rubber gripping means and is securely engaged therewith at single spaced areas of contact throughout the movement of the clamping means. In this manner, a portion of the covering 10 between the areas of engagement with the gripper means is moved axially and radially outwardly flared as shown in FIGURE 2. The downward movement of the jaws 56, 58 moves the upper plates 84, 86 into position circumjacent the covering 10 and defining a substantially continuous cutting edge therearound. The final inward movement of the clamping means toward one another causes the cutting edge of the punch portion 88 to move through two surfaces of the covering 10 and into the mating cavity 90. In this manner, a length of the covering 10 is severed between adjacent covered portions of the wire 12. The apparatus neatly and precisely severs the covering in a circular manner so that there are no frayed ends and no damage is incurred by the wire element 12. When the handles 14, 16 are released and returned to their original open position as shown in FIGURE 1, the wire element 12 may be removed through the access opening 76. As the handles are released and the jaws are opened, the portions of the covering 10 adjacent the gripping means, which were axially inwardly moved and radially outwardly flared, will be returned to substantially their original position since the gripping means 74, 76, 78, 80 will not be released from gripping engagement with the cover 10 until the jaw elements 56, 58 reach a spaced position whereat the compression springs 64, 66 can bias them outwardly. In this manner, an expanse of bare wire 12 will remain having neatly severed end portions of the covering 10.

Referring now to FIGURES 5–8 a modification of the aforedescribed apparatus is illustrated and comprises automatic means to actuate the clamping and severing means. The clamping and severing jaw means are mounted in housing means comprising spaced side plates 102, 104 and upper and lower spacer blocks 106, 108 which define a central guideway. The upper spacer block 106 is provided with a flat lower guide surface 110 and the lower spacer block 108 is provided with an upper contoured guide surface 112. A similarly contoured slide plate 114 is slidably supported on the upper surface 112 and is operably connected to a piston rod 116 of a power cylinder 118. The power cylinder 118 is mounted in a suitable support 120 and is connected in a conventional manner by a fluid line 122 to a valve 124 which may be connected in a conventional manner by a conduit 126 to a high pressure source. An exhaust valve 128 is controlled by a dog 130 which is actuated by conventional mechanism (not shown) when the piston rod 116 reaches the end of its stroke to retract the mechanism. The clamping and severing means comprise a pair of spaced upper clamping jaws 140, 142 and a pair of spaced lower clamping jaws 144, 146. The upper jaw 140 is fixed relative to the housing and the lower clamping jaw 144 is fixed to prevent axial movement in said guideway; but is slidably supported on the slide plate 114 for movement toward the upper jaw 140 against the bias of a compression spring 148. The upper clamping jaw 142 and the lower clamping jaw 146 are movable axially within the guideway with the slide plate 114, and the lower jaw is additionally slidably movable toward the upper jaw against the bias of a compression spring 150 as the slide plate is cammed upwardly by the cam surface 112. A die plate 154 and a punch plate 156 are provided by die elements mounted on each of the jaws as hereinbefore described. In addition, rubber gripper elements are provided as before.

The operation of the apparatus is substantially the same as the operation of the previously described device. As shown in FIGURE 5 which illustrates the open position of the clamping and severing means, the wire 12 may be placed between the jaws through an access opening 157 in the side plate 104. Then, the cylinder 118 may be actuated to force the slide plate 114 outwardly and upwardly due to the camming action of the surface 112. In this manner, the lower jaw 144 is moved upwardly into gripping engagement with the cover against upper jaw 140 and the jaw 146 is moved upwardly into gripping engagement with the cover against the upper jaw 142. The gripper means are maintained in substantially non-sliding engagement with the cover 10 to axially displace a portion of the cover between the die plates and to radially outwardly flare the cover as shown in FIGURE 6. At the end of the stroke of the piston rod 116, the punch portion enters the punch cavity to sever a portion of the covering 10. When the slide plate 114 is retracted, the covering is returned to its original position relative to the wire 12 by the continued actuation of the gripping means until the slide plate reaches a position very close to the original position.

Referring now to FIGURES 9–13, another embodiment of the present invention is illustrated. The apparatus shown in FIGURES 9–15 includes a pair of actuating handles 214, 216 which are pivoted at 218 and provided with upwardly extending actuating arms 220, 222. The arms 220, 222 extend upwardly through slots 224, 225 in a channel shaped plate 226 of a jaw housing formed by side plates 228, 230 which are secured over the channel in any suitable manner to define a guideway. Contoured cam surfaces 231, 232 are formed on the top surface of the guideway. The actuating arms are pivoted at 240, 242 to L-shaped slide members 244, 246. Clamping jaws 248, 250 are pivoted at 252 and 254 to the slide members 244, 246, respectively. Rubber gripping means 260, 262 and 264, 266 are secured to the slide members and jaws as hereinbefore described. Severing means are provided by arcuate grooves 268, 270 in the slide member 248 and jaw 244 which form a punch cavity adapted to receive a punch formed by semicylindrical portions 272, 274 extending outwardly from the slide member 246 and jaw 250. Compression springs 280, 282 are seated on and extend between the members 244, 248 and 246, 250, respectively. The springs bias the pivotally mounted jaws continuously upwardly into engagement with the cam surfaces 231, 232. In operation with the clamping and severing means in the position shown in FIGURE 9, a wire 12 with a covering 10 is mounted between the jaws and the slide members by insertion through an access slot 284 provided between the side plates 228 and 230. The handles 214, 216 are actuated towards one another about the pivot 218 to move the actuating arms 220, 222 toward one another. The slide members 244, 246 are moved inwardly toward one another and carry the pivotally mounted jaws 248, 250 therewith. The compression springs 280, 282 maintain the jaws in engagement with the cam surfaces 231, 232. As the slide members are moved inwardly toward one another, the pivotal jaws are cammed downwardly against the bias of the compression springs until the rubber gripping elements 260, 262 and 264, 266 are firmly engaged with the covering 10. At the same time, the punch forming extensions 272, 274 are aligned with the die cavities 268, 270. Further movement of the slide members toward one another displaces the covering 10 in the spacing interval between the gripping elements and radially outwardly flares the displaced material as shown at 290 in FIGURE 11. The final movement of the slide blocks causes the punch extensions to be moved into the die cavities at which time a portion of the radially outwardly flared material 290 is severed. When the handles 214, 216 are released, the slide members 244, 246 move outwardly from one another and the gripping elements remain in contact with the covering 10 to retract the bunched portion of the covering and expose a length of the wire 12 equal to the amount of flared material which was severed. The compression springs 280, 282 outwardly displace the pivotal jaws at the end of the retracting movement so that the wire may be removed from the tool.

It is contemplated that other severing means may be utilized to sever the radially outwardly flared covering in the manner disclosed. However the punch and die method provides a particularly neat covering end and an even length of exposed wire therebetween. The gripping elements may also be varied in material and construction to obtain the result even though less compact in arrangement and less satisfactory in obtaining a sufficient gripping action. Other obvious modifications in the details of construction and arrangement of the parts are intended to be included within the scope of this invention as defined by the appended claims except insofar as limited by the prior art.

The invention claimed is:

1. Apparatus for removing an outer covering from a wire and the like and comprising a housing, a guideway formed in said housing, a pair of spaced slide blocks slidably mounted in said housing for movement toward and away from one another, clamping means mounted on each slide block for transverse movement relative thereto, cam surfaces formed on said clamping means, cam control surfaces formed in said guideway and being engaged with the cam surfaces of said clamping means during movement of said slide blocks to control transverse displacement of said clamping means, actuating means to move said slide blocks from a first position having a spacing interval therebetween to a second position spaced closely adjacent one another, a wire receiving opening extending longitudinally of said housing and being defined by coaxially aligned grooves formed between said slide blocks and said clamping means, means to position said wire and said covering in said grooves, gripper means provided around each of said grooves and being engageable with said outer covering at spaced points thereon by radial inward movement of said clamping means during sliding movement of said slide blocks toward one another, said gripping means being held in engagement with said covering at said spaced points during further inward movement of said slide blocks to bunch and radially outwardly flare the portion of said covering therebetween, and severing means to sever a portion of said bunched and radially outwardly flared portion of the outer covering in said spacing interval.

2. The apparatus as defined in claim 1 and wherein said severing means comprises a semi-cylindrical punch plate secured to one of said clamping means and another semi-cylindrical punch plate secured to the slide block on which said first clamping means is mounted, said first and second punch plate being positioned and aligned to form a punch annulus located circumjacent the covering when said gripping means are in said gripping position, a first die plate mounted on the other of said clamping means, a second die plate mounted on the other of said slide plates, said die plates defining a cylindrical cavity circumjacent said covering in said gripping position and being dimensioned to receive said punch annulus when said slide blocks are in said second position, and said punch annulus being dimensioned relative to said punch cavity to sever the portions of said bunched and radially flared covering extending radially outwardly therebeyond in said second position.

3. Apparatus for moving an outer covering from a wire and the like and comprising a housing, a guideway formed in said housing, a pair of spaced jaw means mounted in said guideway, one of said jaw means being slidably mounted in said guideway for movement from a first retracted position spaced from said other jaw means to a second extended position closely adjacent said first jaw means, each jaw means comprising a transversely movable jaw element movable between an open position and a closed position, each of said jaw elements operably engaged by a cam slide mechanism, a cam control surface formed in said guideway and supporting said jaw element, power means to move said jaw element along said cam surface and transversely displace said jaw elements from a first open position relative to said jaw means to a second closed position relative thereto, means to seat said wire between each jaw means and its associated jaw element in a position whereat closing movement of the jaw elements relative to the respective jaw means will cause clamping engagement with said covering at spaced intervals therealong, said cam means being contoured to cause clamping engagement with said portions of said covering during movement of said jaw means from said first position to said second position to cause a portion of said covering to be bunched and radially outwardly flared when said jaw means reach said second position, and severing means engageable with said bunched and flared portion of said covering in said second position of said jaw means to sever a portion of said covering and expose a length of said wire.

4. The apparatus as defined in claim 3 and wherein said power means comprises a power cylinder having an actuating rod, means interconnecting said movable jaw means and said cam slide whereby actuation of said power cylinder simultaneously moves said jaw means from said first position to said second position and moves said jaw elements from said open position to said closed position.

5. Apparatus for removing an outer covering from a wire and the like and comprising a housing, a guideway formed in said housing, a pair of spaced slide means mounted in said guideway, jaw elements pivoted to said slide means, a cam surface provided in said guideway and being engaged with said jaw elements, actuating means to move said slide means from a first position defining a spacing interval therebetween to a second position closely adjacent one another, said cam means being contoured to move said jaw elements from an open position when said slide means are in said first position to a closed position during movement of said slide means to said second position, means to receive said wire between said jaw means and said slide means, gripping means provided on said jaw means to engage and grip spaced portions of said covering during movement of said slide means from said first position to said second position, said gripping means being engaged with said portions at a point of movement of said slide means prior to said second position to enable said covering to be bunched and radially outwardly flared a predetermined amount before said slide means reach said second position, and severing means to sever a portion of the bunched and radially flared covering in said second position to expose a length of said wire.

6. The apparatus as defined in claim 5 and wherein said severing means comprises a punch cavity formed in one of said slide means and being positioned circumjacent said covering, a punch integrally formed on the other of said slide means and being located circumjacent said covering in said second position, said punch means and said punch cavity being closely dimensioned to sever the radially outwardly flared portion of said covering extending beyond the mating peripheries of the punch and the punch cavity.

References Cited in the file of this patent

UNITED STATES PATENTS

| | | |
|---|---|---|
| 1,874,216 | Andren | Aug. 30, 1932 |
| 1,987,959 | Knuuti et al. | Jan. 15, 1935 |
| 2,594,684 | Rothe | Apr. 29, 1952 |
| 2,731,714 | Dudley | Jan. 24, 1956 |
| 2,842,992 | Hindenburg | July 15, 1958 |
| 2,874,457 | Bennett | Feb. 24, 1959 |
| 2,886,995 | Bach et al. | May 19, 1959 |
| 2,920,513 | Baird et al. | Jan. 12, 1960 |
| 2,929,285 | Gulemi | Mar. 22, 1960 |
| 2,988,940 | Folkenroth et al. | June 20, 1961 |
| 3,018,679 | Schwalm et al. | Feb. 6, 1962 |
| 3,044,333 | Broske | July 17, 1962 |
| 3,085,455 | Hurlbut et al. | Apr. 16, 1963 |

FOREIGN PATENTS

| | | |
|---|---|---|
| 609,834 | Great Britain | Oct. 7, 1948 |